(12) United States Patent
Mendez et al.

(10) Patent No.: US 11,227,098 B2
(45) Date of Patent: Jan. 18, 2022

(54) METHOD AND APPARATUS FOR CO-BROWSING SHADOW DOM ELEMENTS

(71) Applicant: Glance Networks, Inc., Wakefield, MA (US)

(72) Inventors: Deborah Mendez, Arlington, MA (US); Brendan Ronan, Somerville, MA (US)

(73) Assignee: Glance Networks, Inc., Wakefield, MA (US)

( * ) Notice: Subject to any disclaimer, the term of this patent is extended or adjusted under 35 U.S.C. 154(b) by 0 days.

(21) Appl. No.: 17/173,371

(22) Filed: Feb. 11, 2021

(65) Prior Publication Data

US 2021/0266355 A1 Aug. 26, 2021

Related U.S. Application Data

(60) Provisional application No. 62/979,121, filed on Feb. 20, 2020.

(51) Int. Cl.
| | |
|---|---|
| *G06F 40/143* | (2020.01) |
| *H04L 29/08* | (2006.01) |
| *G06F 16/957* | (2019.01) |
| *G06F 3/0485* | (2013.01) |
| *G06F 16/955* | (2019.01) |

(52) U.S. Cl.
CPC .......... *G06F 40/143* (2020.01); *G06F 3/0485* (2013.01); *G06F 16/955* (2019.01); *G06F 16/9577* (2019.01); *H04L 67/02* (2013.01)

(58) Field of Classification Search
CPC ... G06F 40/143; G06F 3/0485; G06F 16/9577
See application file for complete search history.

(56) References Cited

U.S. PATENT DOCUMENTS

| | | |
|---|---|---|
| 9,690,764 B1 | 6/2017 | Batni |
| 10,474,416 B1 | 11/2019 | Farivar et al. |
| 10,482,148 B2 | 11/2019 | Walker et al. |

(Continued)

OTHER PUBLICATIONS

International Search Report from related PCT application PCT/US2021/017599 dated Jun. 4, 2021 (3 pages).

(Continued)

*Primary Examiner* — Asher D Kells
(74) *Attorney, Agent, or Firm* — Anderson Gorecki LLP

(57) ABSTRACT

Co-browsing shadow DOM elements is enabled by detecting shadow host DOM elements and nested shadow host DOM elements on the visitor DOM. Identifiers are attached to the DOM elements within shadow DOM regions to uniquely and efficiently identify the DOM elements within shadow DOM regions and nested shadow DOM regions. When shadow DOM elements are transmitted on the co-browse session, the identifiers specify where the DOM elements are located (which shadow DOM regions) so that the agent co-browse JavaScript is able to efficiently locate the DOM elements without querying each shadow DOM region. The agent co-browse JavaScript maintains a map correlating shadow root identifiers with the HTML of the shadow DOM regions and associated constructed stylesheets, so that the HTML of a shadow DOM region is not required to be re-transmitted if the portion of the DOM including the shadow host is replaced.

14 Claims, 7 Drawing Sheets

(56) References Cited

U.S. PATENT DOCUMENTS

| | | |
|---|---|---|
| 2009/0164581 A1 | 6/2009 | Bove et al. |
| 2015/0134669 A1* | 5/2015 | Harris ................. G06F 16/2246 |
| | | 707/741 |
| 2016/0057220 A1* | 2/2016 | Gibbs ....................... G06F 8/65 |
| | | 709/203 |
| 2017/0351648 A1 | 12/2017 | Batni |
| 2018/0011678 A1 | 1/2018 | Shipper et al. |
| 2018/0329972 A1* | 11/2018 | Cheng ................. G06F 16/2246 |
| 2019/0171770 A1* | 6/2019 | Walker ................. G06F 16/954 |

OTHER PUBLICATIONS

Written Opinion from related PCT application PCT/US2021/017599 dated Jun. 4, 2021 (5 pages).

* cited by examiner

METHOD AND APPARATUS FOR CO-BROWSING SHADOW DOM ELEMENTS

CROSS REFERENCE TO RELATED APPLICATIONS

This application claims priority to U.S. Provisional Patent Application No. 62/979,121, filed Feb. 20, 2020, the content of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to communication sessions and, more particularly, to a method and apparatus for co-browsing shadow DOM elements.

DESCRIPTION OF THE RELATED ART

It is possible for the content of a first browser to be shared and reproduced in a second browser at a geographically remote location. One way to do this is to cause the Document Object Model (DOM) describing the content of the first browser to be forwarded to the second browser. The second browser uses the DOM received from the first browser to recreate the content of the first browser. Implementing DOM sharing between a pair of computers is referred to herein as co-browsing.

The Document Object Model (DOM) of an XML or HTML document is a tree-like structure, wherein each DOM element is an object representing a part of the document. It is possible to create a scoped area within the DOM that has DOM elements that are not visible to the rest of the tree. Such DOM elements are referred to herein as "shadow DOM elements", and the regions of the DOM that contains the shadow DOM elements are referred to herein as a "shadow DOM regions". Global attributes do not apply to shadow DOM elements in a shadow DOM region, which enables portions of DOM to be reused without consideration of how the other attributes of the DOM will affect the shadow DOM elements of the shadow DOM regions. Shadow DOM regions may be nested, such that there can be inner shadow DOM regions inside a given shadow DOM region, and the nesting may occur to any desired level.

The use of shadow DOM complicates co-browsing, because particular functions that co-browsing may use to identify DOM elements do not work due to the nature of the shadow DOM. For example, calling e.outerHTML on element "e" normally gets the serialized HTML fragment describing the element, including its descendants. Similarly, calling e.innerHTML normally gets or sets the HTML contained within the element "e". However, when these functions are called on an element "e" that contains a shadow DOM element, the function does not return the content of the shadow DOM region.

As another example, the function document.querySelectorAll( ) normally returns a static list representing a document's elements that match a group of selectors. When this function is called on a DOM that includes shadow DOM elements, however, the function does not return elements that are inside of the shadow DOM regions of the DOM tree.

Accordingly, it would be advantageous to provide a method and apparatus for co-browsing shadow DOM elements.

SUMMARY

The Summary and Abstract sections are provided herein to introduce some concepts discussed in the Detailed Description below. The Summary and Abstract sections are not comprehensive and are not intended to delineate the scope of protectable subject matter, which is set forth by the Claims presented below.

All examples and features mentioned below can be combined in any technically possible way.

Co-browsing shadow DOM elements is enabled by detecting shadow host DOM elements and nested shadow host DOM elements on the visitor DOM, and creating an identifier scheme to uniquely and efficiently identify the shadow DOM regions and nested shadow DOM regions. When shadow DOM elements are transmitted on the co-browse session, the identifiers specify where the DOM elements are located (which shadow DOM region) so that the agent co-browse JavaScript is able to efficiently locate the shadow DOM elements without querying each shadow DOM region. Where constructed stylesheets have been applied to the shadow DOM regions, the constructed stylesheets are also transmitted on the co-browse session. The agent co-browse JavaScript maintains a map correlating shadow root identifiers of the shadow DOM regions and the HTML of the shadow DOM regions and constructed stylesheets, so that the HTML and constructed stylesheets of the shadow DOM regions are not required to be re-transmitted if the portion of the DOM including the shadow host is replaced.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of some embodiments of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
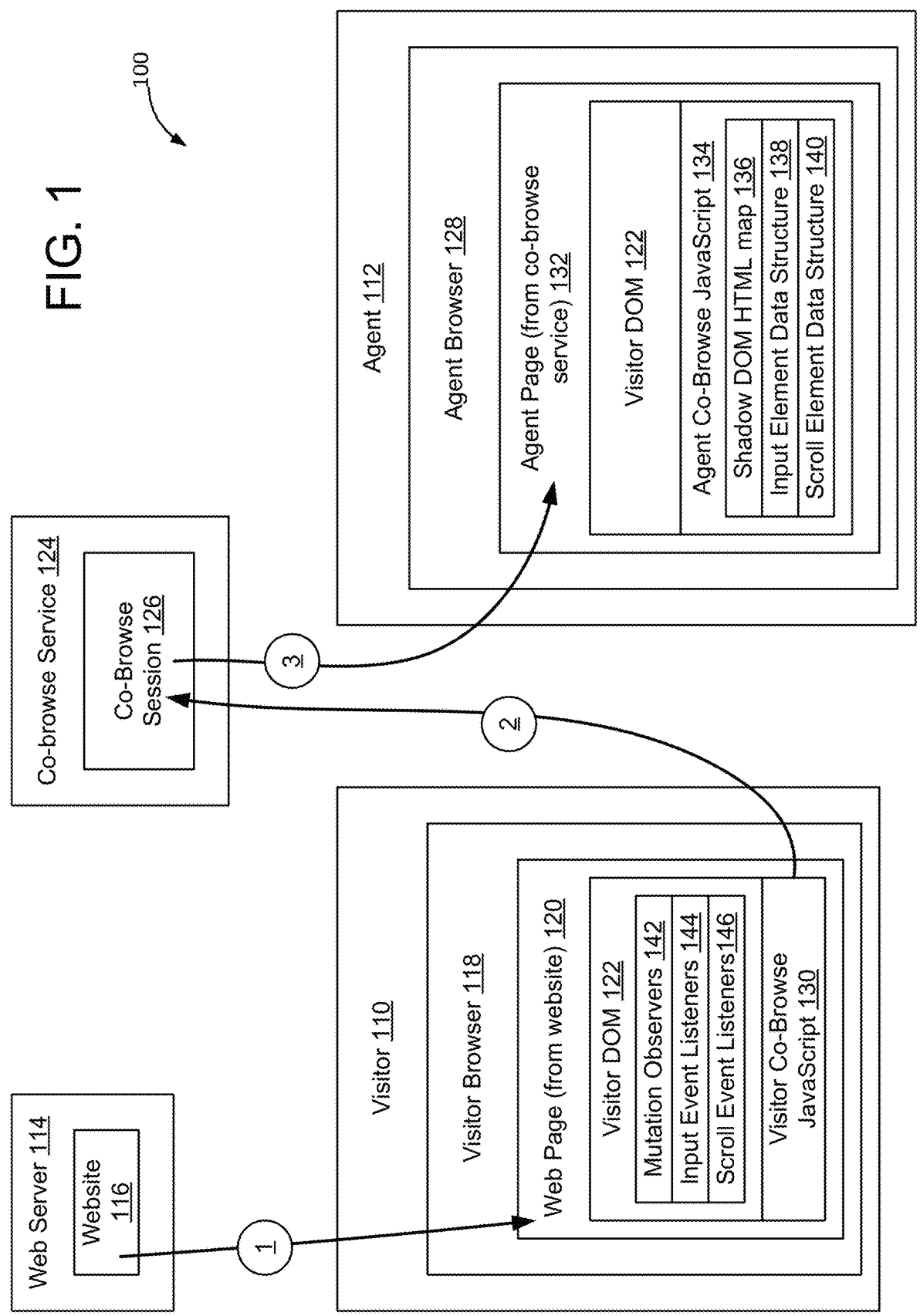
FIG. 1 is a functional block diagram of a network of components enabling co-browsing between a visitor and an agent, according to some embodiments.

FIG. 1 is a functional block diagram of a network 100 of components enabling co-browsing of a webpage including shadow DOM regions between a visitor 110 and an agent 112. As shown in FIG. 1, in some embodiments a web server 114 hosts website 116. A visitor 110 accesses website 116 using visitor browser 118 to load a web page 120 from the web server 114 (arrow 1). The web page 120 is described by visitor DOM 122 which, as described below, in some instances includes shadow DOM regions 204 and nested shadow DOM regions 204 (see FIG. 2).

A co-browse service 124 facilitates a co-browse session 126 on which the agent 112 is able to view the content of the visitor browser 118 in agent browser 128 (arrows 2 and 3).

In some embodiments, the web page 120 loaded by visitor browser 118 from web server 114 is scripted with co-browse JavaScript 130. Alternatively, the co-browse JavaScript 130 may be loaded to visitor browser 118 as a plugin or extension, e.g. from co-browse service 124. If a co-browse session 126 is established, co-browse JavaScript 130 captures the Document Object Model (visitor DOM 122) describing the web page 120 loaded in visitor browser 118, and forwards the visitor DOM 122 to the co-browse service 124 on the co-browse session 126 (arrow 2). The co-browse service 124 provides the agent 112 with an agent page 132 that is loaded to agent browser 128 (arrow 3). The agent page 132 includes the visitor DOM 122 and agent co-browse JavaScript 134. As changes occur to the visitor DOM 122 on the visitor 110, those changes are captured by the visitor co-browse JavaScript 130 and sent by the visitor 110 to the co-browse service 124 on the co-browse session 126 to be relayed to the agent 112. In this manner, co-browse service 124 facilitates transmission of the visitor DOM 122 and changes to the visitor DOM 122 to the agent browser 128 on co-browse session 126, to enable the agent browser 128 to have a consistent view of the content of the visitor's browser 118. Additional details of how an example co-browse system of this nature may be implemented are provided in U.S. Pat. No. 9,736,214, entitled INTEGRATING CO-BROWSING WITH OTHER FORMS OF INFORMATION SHARING, the content of which is hereby incorporated herein by reference.

Throughout this description the term "visitor" will be used to refer to the computer that has a browser 118 acting as the source of content on a co-browse session 126. The term "visitor" is not intended to be limiting, as other terms such as "presenter" or "content source" could equally be used. Thus, the term "visitor" is used merely for convenience. Likewise, throughout this description the term "agent" will be used to refer to the computer that has a browser 128 acting as the recipient of the content on the co-browse session 126. The term "agent" is not intended to be limiting, as other terms such as "viewer" or "content recipient" could equally be used. Thus, the term "agent" is used merely for convenience. The terms "visitor" and "agent" are not intended to limit the scope of the disclosure to only apply to the use case where a visitor to a website opens a co-browse session to obtain assistance from an agent in a call center associated with the website, although that is one possible use of co-browse sessions.

Figure 2:
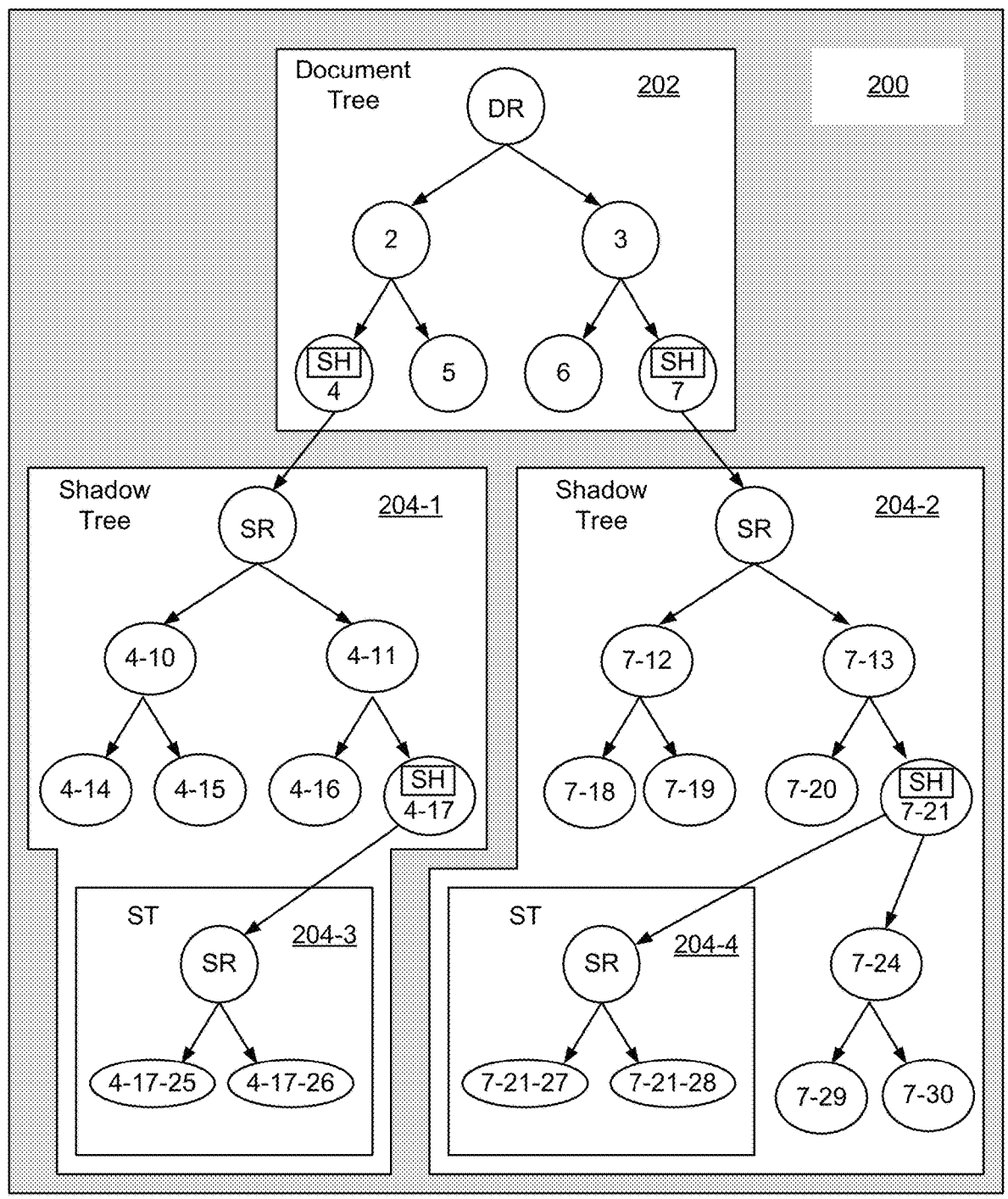
FIG. 2 is a functional block diagram of an example DOM describing a hypothetical web page that may be loaded to a browser such as the visitor browser of FIG. 1.

FIG. 2 is a functional block diagram of an example DOM 200 describing a hypothetical web page 120 that may be loaded to a browser such as the visitor browser 118 of FIG. 1. As shown in FIG. 2, the DOM 200 describing a web page, such as web page 120, includes a Document Root (DR) DOM element labeled element DR in FIG. 2, and a tree-like structure of DOM elements. Each element of the DOM is assigned an element identifier, referred to herein as a data-gid. The particular manner in which the data-gids are assigned to enable DOM elements to be located within shadow DOM regions is discussed in greater detail below. As described in greater detail below, some elements of the DOM 200 are Shadow Host DOM elements, which are labeled SH in FIG. 2. Each Shadow Host SH DOM element references a Shadow Root SR of a shadow DOM region 204. Shadow Roots are labeled SR in FIG. 2. Shadow Roots are part of the DOM, but are not DOM elements, and as such are not assigned element ids and do not have assigned attributes.

Some of the elements in the example DOM 200 of FIG. 2 are shadow host DOM elements, which are labeled SH in FIG. 2. In some embodiments, a shadow host element SH is a DOM element for which the native attachShadow method has been called. The portion of the DOM tree 200 between the document root element DR and the first level of shadow host elements SH (SH-4 and SH-7) is referred to herein as the "top-level DOM" 202. The portion of the DOM tree 200 that sits below a shadow host element, and is hidden from the top-level DOM 202, is referred to herein as a shadow DOM region 204. Each shadow DOM region 204 includes a shadow tree, which is a portion of the DOM that is hidden from the rest of the DOM. The shadow tree has a shadow root, labeled SR in FIG. 2, and possibly one or more DOM elements that sit below the shadow root SR in the shadow DOM region 204. DOM elements in the shadow DOM region can be shadow host elements SH, to thus enable shadow DOM regions to be nested to an arbitrary depth. For example, shadow host element with data-gid=4-17 is located within a shadow DOM region 204-1 below a shadow host with a data-gid=4. Accordingly, the shadow DOM region 204-3 below shadow host element 4-17 is a nested shadow DOM region because it sits below a shadow host element 4-17 that is itself located within a shadow DOM region 204-1.

In some embodiments, a shadow host element SH is an element in the DOM 200 for which the native attachShadow method has been called, thereby creating a shadow DOM region, which can be accessed via the element's shadow-Root attribute. There is no native browser functionality to enumerate all shadow host elements SH. In some embodiments, shadow host elements SH in DOM 200 are detected by examining the shadowRoot attribute of each DOM element. If the shadowRoot attribute of a DOM element is non-null, and is a native shadow Root created by calling the native attachShadow method, the element is treated as a shadow host element SH. In some embodiments, when a shadow host element SH is detected, it is assigned a shadow host identifier referred to herein as a data-sdid which is assigned to the shadow host element SH as an attribute. A shadow host element ID (data-sdid) can be identical to the shadow host element identifier (data-gid), or can be a different identifier. In some embodiments, the presence of a shadow host ID (data-sdid) attribute on an element identifies the DOM node as a shadow host, and can be used to search for shadow hosts within the DOM. For example, document.querySelectorAll("[data-sdid]") returns a NodeList containing all shadow host elements in the top-level document.

In some embodiments, there are several opportunities to detect shadow host elements SH with shadow root SR properties. For example, when the co-browse JavaScript 130 initially loads, the co-browse JavaScript 130 scans the entire DOM 200 to identify any DOM elements which have a shadowRoot property. Subsequently, when DOM elements are added to the DOM 200 dynamically via JavaScript on the web page 120, the co-browse JavaScript 130 scans the newly added DOM elements to see if any of the newly added DOM elements have a shadowRoot property. This step applies to DOM elements added to the top-level DOM region 202 as well as to elements added to a shadow DOM region 204. Finally, the co-browse JavaScript 130 overrides the native attachShadow method to detect when a shadowRoot property is added to a DOM element that is already part of the DOM 200, to thereby detect when DOM elements are converted to shadow host elements.

In some embodiments, scanning the visitor DOM 122 or a portion of the visitor DOM 122 for shadow host elements SH involves a depth first or breadth first traversal of the DOM 200. In a depth first traversal, the search algorithm starts at the document root element DR and explores as far as possible along each branch of the DOM 200 before backtracking. In a breadth first traversal, the search algorithm starts at the document root element DR and explores all of the neighbor DOM elements at the present depth prior to moving on to the DOM elements at the next level. If, at any point, a DOM element with a shadowRoot property is encountered (i.e. a shadow host element is located), the scan proceeds to traverse the shadow tree of the shadow DOM region 204 of that shadow host element SH, looking for nested shadow host elements SH. Shadow host elements SH can be detected for arbitrary levels of nesting. In some embodiments, the DOM of the shadow tree is only able to be scanned for nested shadow host elements SH if the shadow root is "open". Closed shadow roots cannot be co-browsed.

Figure 3:
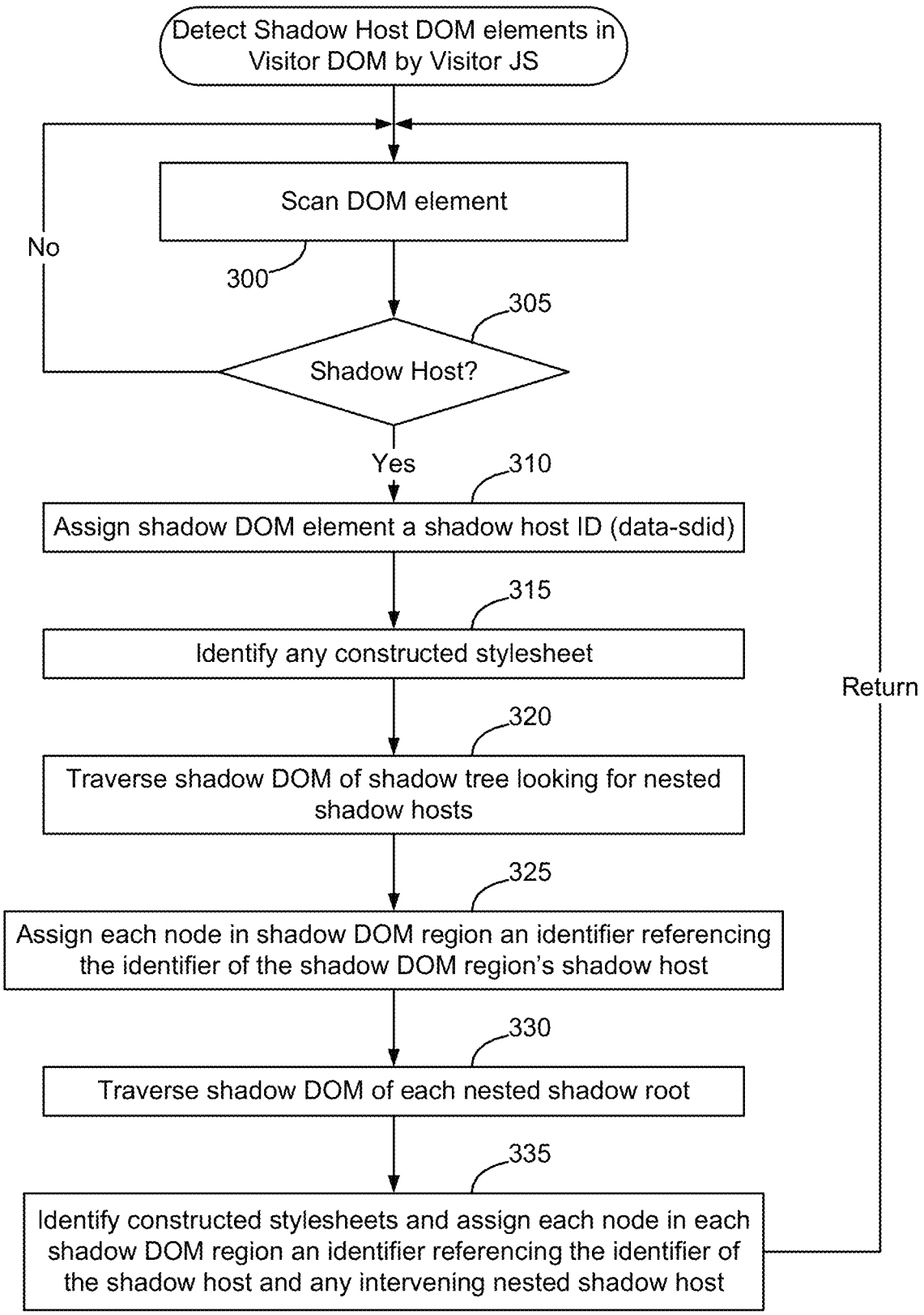
FIGS. 3-7 are flow charts of portions of a method of co-browsing shadow DOM elements, according to some embodiments.

FIG. 3 is a flow chart of a portion of a method implemented by the co-browse JavaScript 130 to detect shadow host elements SH in the visitor DOM 122 in connection with scanning the visitor DOM 122 or a portion of the visitor DOM 122. As shown in FIG. 3, the visitor co-browse JavaScript 130 scans the first DOM element, which may be the document root element DR or another DOM element in visitor DOM 122 (block 300), to determine if the DOM element is a shadow host element SH. Scanning the DOM element may be implemented, in some embodiments, by determining if the DOM element has a shadowRoot property.

At block 305, the visitor co-browse JavaScript 130 determines if the DOM element is a shadow host element. If the DOM element is not a shadow host element (a determination of NO at block 305), the JavaScript continues to process additional DOM elements in the visitor DOM 122 (block 300) until each DOM element has been evaluated. If the DOM element is a shadow host element SH (a determination of YES at block 305) in some embodiments the visitor co-browse JavaScript 130 assigns the node a shadow host identifier (data-sdid) or sets an attribute of the DOM element identifying the DOM element as a shadow host (block 310). In some embodiments, the shadow host identifier for a given shadow host DOM element is the same as the DOM element id (data-gid). In some embodiments, the shadow host identifier (data sdid) or the DOM element identifier of the shadow host element SH is the shadow root identifier of a shadow root portion of a shadow DOM region 204. A shadow host element SH can also have non-shadow children in the DOM 200. Whenever a shadow host element is identified, a determination is made as to whether any constructed stylesheets have been applied to the shadow root referenced by the shadow host element (block 315).

The JavaScript 130 traverses the shadow DOM region 204 looking for nested shadow host elements SH (block 320). In some embodiments the shadow DOM region 204 is traversed preferentially once a shadow host element SH is encountered, regardless of whether a breadth first or depth first algorithm is being used to scan the visitor DOM 122.

In some embodiments, as the visitor co-browse JavaScript 130 traverses the shadow DOM region 204, the visitor co-browse JavaScript 130 assigns each DOM element in the shadow DOM region 204 a DOM element identifier (data-gid) referencing the shadow host element SH of the shadow DOM region 204, and uniquely identifying the DOM element within the shadow DOM region 204 (block 325). For example, in FIG. 2 if the shadow host SH-4 is assigned a data-gid="4", each of nodes within the shadow DOM region 204-1 rooted at shadow host element SH-4 will have an identifier in the form data-gid="4-n" where n is a unique identifier within the shadow DOM region 204. For example, as shown in FIG. 2, the nodes within shadow DOM region 204-1 have node IDs (data-gids) 4-10, 4-11, 4-14, 4-15, 4-16, and 4-17.

If a nested shadow host SH is encountered within the shadow DOM region 204, the shadow host SH is assigned a shadow host identifier (data-sdid) or an attribute of the DOM element is set identifying the DOM element as a shadow host. All nodes within the nested shadow DOM region 204 are assigned a unique identifier within the nested shadow DOM region 204 that identifies both the top-level shadow host element and the identity of any intervening shadow host elements. For example, in FIG. 2, DOM element SH 4-17 within shadow DOM region 204-1 is a shadow host element SH. If the shadow host element 17 is assigned a data-gid"4-17" and data-sdid="4-17", each of the nodes 25-26 within the nested shadow DOM region rooted under shadow host SH 17 will have an identifier (data-gid) in the form data-gid="4-17-n" where n is a unique identifier within the shadow DOM region 204. Thus, as shown in FIG. 2, the shadow DOM region 204-3 includes two nodes, with data-gids equal to 4-17-25 and 4-17-26.

Thus, the visitor co-browse JavaScript 130 traverses the shadow DOM region 204 of each nested shadow host element SH (block 330) and assigns each DOM element in each shadow DOM region 204 an identifier referencing the identifier of the shadow host element SH for the DOM region 204, and any intervening shadow host elements SH (block 335) between the document root DR and the current shadow root SR.

For example, looking at FIG. 2, when the visitor co-browse JavaScript 130 traverses the DOM 200 it will encounter DOM element #4 which is a shadow host element SH. For ease of explanation, it is assumed in this example that the visitor co-browse JavaScript 130 would assign element #4 "data-gid=4", although any value could be assigned to DOM element #4 as long as the value is unique within DOM 200. The shadow DOM region 204-1 includes the shadow root (SR) and DOM elements 10, 11, 14, 15, 16, and 17. In some embodiments, the identifiers for these elements are:

Shadow Root: no data-gid
element #10: data-gid=4-10
element #11: data-gid=4-11
element #14: data-gid=4-14
element #15: data-gid=4-15
element #16: data-gid=4-16
element #17: data-gid=4-17

DOM element 17 is a nested shadow host element SH. DOM elements that are within the shadow DOM region 204-3 need to reference both shadow host element #4 and shadow host element #17. For example, in some embodiments the identifiers for DOM elements #25 and #26 are:
element #25: data-gid=4-17-25
element #26: data-gid=4-17-26

This numbering scheme can continue for multiple levels of nested shadow DOM regions so that there is no limit on the depth of nesting of the shadow DOM regions. By having a hierarchical numbering scheme for the nested shadow elements, it is possible to quickly identify, to the agent 212, where to locate a particular shadow DOM element or shadow DOM region for insertion into the DOM 200 when a portion or all of the visitor DOM 122 needs to be updated.

As noted above, to support co-browse, every element in the visitor DOM 122 is assigned a unique id in a custom attribute "data-gid". The data-gid attribute allows the visitor to reference specific elements when communicating changes to the agent co-browse JavaScript 134. Example changes could include instructions such as: "Remove DOM element with data-gid #25", or "Add <html> to DOM element with data-gid #18 after the element with data-gid #13".

In some embodiments, the agent co-browse JavaScript 134 can locate a referenced element using a css selector. For example: document.querySelectorAll("[data-gid='6']") can be used to locate the element with data-gid="6".

The native JavaScript function document.querySelectorAll only returns elements that are within the top-level portion of DOM 202, and will not return elements within shadow DOM regions 204. In the above example, document.querySelectorAll("[data-gid='4-16']") will not return the location of DOM element #16 because DOM element #16 with data-gid="4-16" is if located within a shadow DOM region 204.

One way to find an element that is located within a shadow DOM region 204, i.e. to find DOM element #16 with data-gid="4-16" would be to separately call e.shadowRoot.querySelectorAll for each of the shadow DOM elements e in the DOM 200. In effect, this would result in performing a separate search for element #16 in each of the shadow DOM regions 204 and in each of the nested shadow DOM regions, which would be inefficient, particularly in situations where there are many shadow DOM regions 204.

To avoid having to call querySelectorAll( ) on each of the shadow DOM regions, the element lookup can take advantage of the fact that the data-gid for elements within a shadow DOM region 204 are prefixed with the data-gid of the shadow host element of the shadow DOM region. For example:

```
<div data-gid="72" data-sdid="72">
    #shadow-root (open)
        <style data-gid="72-546">...</style>
        <div data-gid="72-547">
            <a data-gid="72-548" href="#abc">link</a>
        </div>
</div>
```

In this case the shadow host element has data-gid=72, and all the elements in the shadow DOM region below the shadow host have data-gids prefixed with 72. When the agent co-browse JavaScript 134 needs to locate an element with data-gid="72-547", it first finds the element e with data-gid="72" by calling var e=document.querySelectorAll("[data-gid='72']"), then calls e.querySelectorAll("[data-gid='72-547']") on the element #72. This approach can be employed for locating elements nested at arbitrary levels of nested depth. The number of calls to querySelectorAll that are required to locate the element is the number of levels of nesting.

Figure 4:
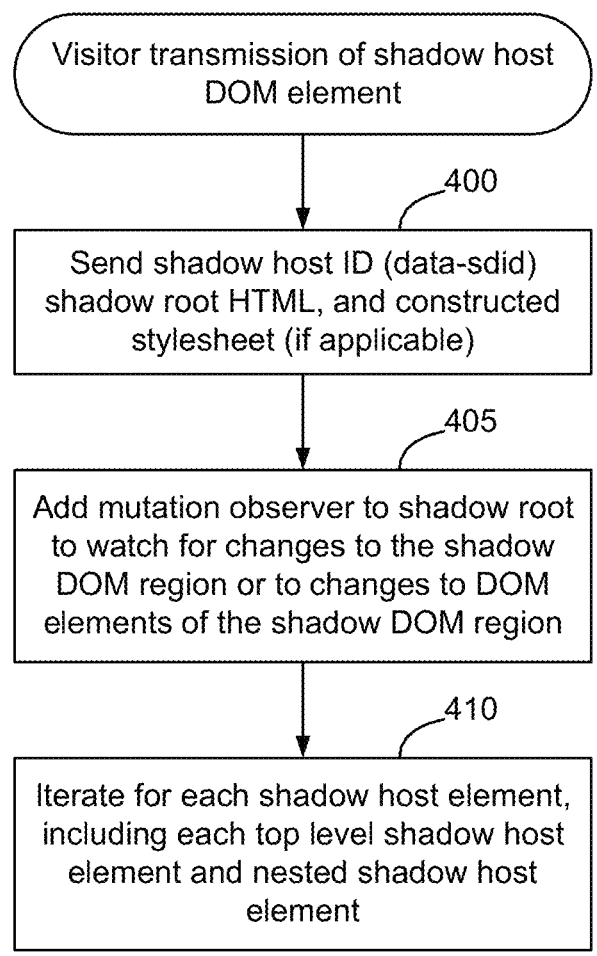

FIG. 4 is a flow diagram of a portion of a method implemented by the visitor co-browse JavaScript 130 when transmitting a shadow host element SH referencing a shadow root and associated shadow DOM region. As shown in FIG. 4, in some embodiments, when a shadow host element SH is detected, the entire content of the shadow DOM region 204 associated with the shadow root is uploaded to the co-browse service 124 to be forwarded to the agent browser 128 (block 400). In addition, a mutation observer 142 is added to the shadow root to watch for subsequent changes to the shadow DOM region 204 (block 405). Mutation observers 142 are similarly added to nested shadow roots to monitor the nested shadow DOM regions 204. This process iterates for each shadow host, including each top level shadow host (e.g. FIG. 2 SH 4 and SH 7) and nested shadow host (block 410) (e.g. FIG. 2 SH 4-17 and SH 7-21).

In some embodiments, the HTML content of the shadow DOM region 204 associated with a shadow host element "e" is obtained by calling e.shadowRoot.innerHTML. The visitor co-browse JavaScript 130 then sends a message via the co-browse service 124 to the agent browser 128 with the data-gid of the shadow host element and the HTML contents of the shadow DOM region.

In some embodiments, in addition to the HTML content of the shadow DOM region, the visitor co-browse JavaScript 130 also determines if there are any constructed stylesheets that have been applied to the shadow root of the shadow DOM region. A constructable stylesheet is a way of creating and using CSS stylesheets, which can be applied to a shadow root using the adoptedStylesheet property. The adoptedStylesheet property enables the styles defined by a CSSStyleSheet to be explicitly applied to a given DOM subtree, for example the DOM subtree within the shadow DOM region, by applying the stylesheet to the shadow root.

In some embodiments, when the visitor co-browse JavaScript 130 identifies a DOM element as a shadow host element SH and assigns a data-gid to the shadow host element, the visitor co-browse JavaScript 130 also checks the shadow root adoptedStylesheets property to determine if a constructed stylesheet has been applied to the shadow root (block 315). If a constructed stylesheet has been applied to the shadow root of the shadow DOM region, the JavaScript 130 notes the existence of the constructed stylesheet and streams the constructed stylesheet to the agent 112 on the co-browse session 126 (block 400), to enable the same constructed stylesheet to be applied to the shadow DOM root on the agent side. The visitor co-browse JavaScript 130 checks all shadow host elements SH in this manner, both top level and nested, to identify all constructed stylesheets that are in use in each of the top level and nested shadow DOM regions.

Figure 5:
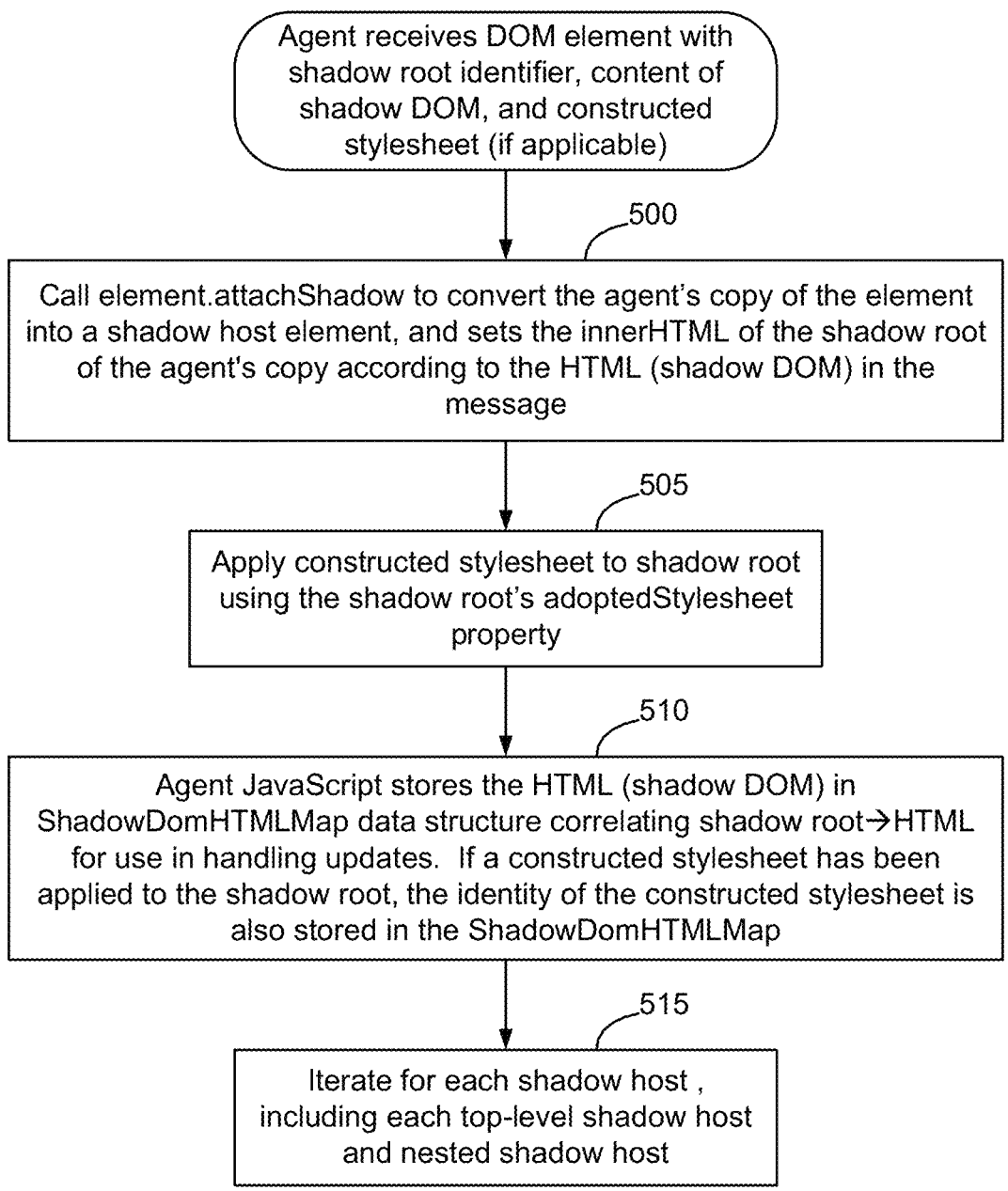

FIG. 5 is a flow diagram of a portion of a method implemented by the agent co-browse JavaScript 134 when receiving a shadow host element and associated shadow DOM. As shown in FIG. 5, when the agent 112 receives a message identifying a DOM element as a shadow host element, the agent co-browse JavaScript 134 locates the specified element "e" by its data-gid, calls e.attachShadow to convert the agent's copy of the element "e" into a shadow host element, and sets the innerHTML of the shadow root of the agent's copy according to the HTML (shadow DOM) in the message (block 500). The agent co-browse JavaScript 134 also determines if a constructed stylesheet is to be applied to the shadow root, and if so attaches constructed stylesheet to the shadow root using the shadow root's adoptedStylesheets property (block 505).

In some embodiments, the agent side JavaScript 134 also stores the HTML of the Shadow DOM in a Shadow DOM HTML map 136 that correlates shadow host data-gid HTML for use in handling updates (block 510). For instances where a constructed stylesheet is to be applied to a shadow root, the agent side JavaScript 134 also stores an identifier of the respective constructed stylesheet in the Shadow DOM HTML map 136. This process iterates for each shadow host element SH, including each top-level shadow host elements SH (e.g. FIG. 2, SH 4 and SH 7) and nested shadow host elements SH (block 515) (e.g. FIG. 2, SH 4-17 and SH 7-21).

Figure 6:
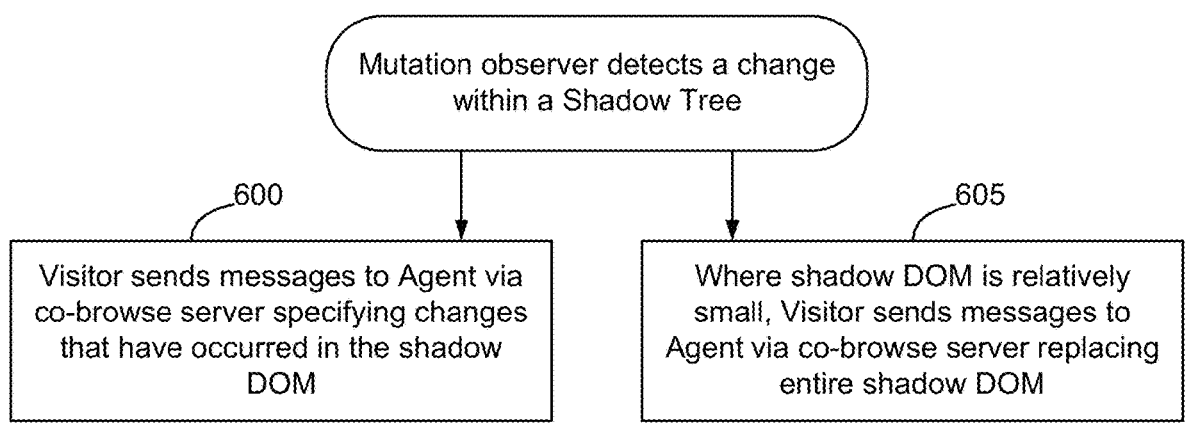

FIG. 6 is a flow diagram of a portion of a method implemented by the visitor co-browse JavaScript 130 when a change is detected to a shadow root or a shadow DOM element in a shadow DOM region 204 rooted at the shadow root. As shown in FIG. 6, when one of the mutation observers 142 detects a change in a shadow DOM region, the visitor co-browse JavaScript 130 will notify the agent of the changes to the shadow DOM region 204. In some embodiments, the visitor co-browse JavaScript 130 sends messages to the agent 112 via the co-browse service 124 specifying the changes that occurred, so that the agent co-browse JavaScript 134 can apply the same changes in the Agent's view (block 600). Alternatively, since shadow DOM regions 204 are often small, in some cases it is more efficient to re-send the entire shadowRoot.innerHTML rather than send messages describing the individual updates to the shadow DOM region (block 605). This approach also allows the agent 112 to maintain an accurate Shadow Dom HTML Map 136 from which it can reconstruct a shadow DOM region 204 at any time. If the shadow root has a constructed stylesheet applied to it, and the visitor re-sends the entire shadowRoot.innerHTML, the identity of the constructed stylesheet is also transmitted by the visitor co-browse JavaScript 130.

It is also possible for the constructed stylesheet to be changed, or for a new constructed stylesheet to be applied to a DOM element. In some embodiments, the visitor co-browse JavaScript 130 watches for changes to constructed stylesheets, and if a change to the constructed stylesheet is detected, the newly constructed stylesheet is transmitted to the agent 112 on the co-browse session 126. Likewise, in some embodiments, the visitor JavaScript watches for changes related to which constructed stylesheet is applied to a given element, and if a different constructed stylesheet is applied to a given element, the identity or the content of the different constructed stylesheet is transmitted to the agent 112 on the co-browse session 126.

Figure 7:
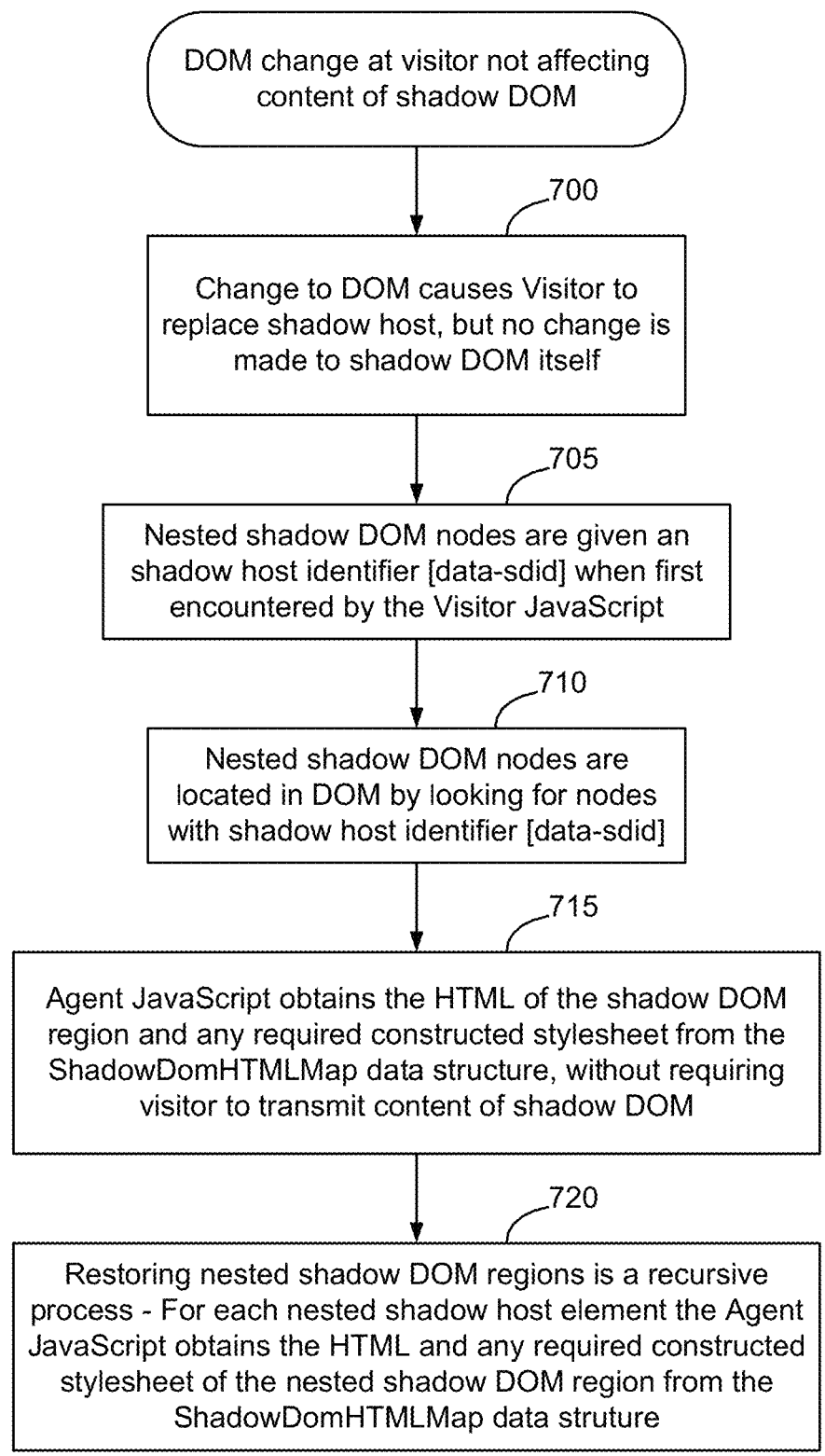

FIG. 7 is a flow diagram of a portion of a method implemented by the agent co-browse JavaScript 134 when receiving a DOM change that results in replacing a portion of the DOM that contains a shadow DOM region 204. As shown in FIG. 7, in some cases during a co-browse session 126, all or a portion of the top-level DOM 202 may be replaced on the agent side. One reason this replacement may happen is when there are a large number of incremental updates to the visitor DOM 122 or a portion of the visitor DOM 122, such that it is more efficient for the visitor 110 to send a complete replacement on the co-browse session 126 rather than send a large number of incremental updates. If the replaced portion of the DOM 200 includes a shadow DOM region 204 that is not itself changed (block 700), the elements of the shadow DOM region 204 will need to be restored by the agent co-browse JavaScript 134 after the top level DOM 202 has been replaced.

For example, if the DOM structure on both the Visitor and Agent originally looked like this:

```
<div data-gid="70">
    <p data-gid="71">...</p>
    <div data-gid="72" data-sdid="72">
        #shadow-root (open)
            <style data-gid="72-546">...</style>
            <div data-gid="72-547">
                <a data-gid="72-548" href="#abc">link</a>
            </div>
    </div>
</div>
```

And the DOM on the Visitor side then changes to:

```
<div data-gid="70">
    <div data-gid="72" data-sdid="72">
        #shadow-root (open)
            <style data-gid="72-546">...</style>
            <div data-gid="72-547">
                <a data-gid="72-548" href="#abc">link</a>
            </div>
    </div>
    <div data-gid="80">New HTML</div>
</div>
```

Rather than convey two incremental updates, one to remove element with data-gid="71" and another to add the div with data-gid="80", the visitor Co-browse JavaScript 130 can more concisely send new HTML for the element data-gid 70:

```
<div data-gid="70">
    <div data-gid="72" data-sdid="72">
    </div>
    <div data-gid="80">New HTML</div>
</div>
```

This HTML is obtained by accessing the outerHTML attribute on the element data-gid="70", and therefore does not include the hidden shadow DOM html. The Agent side applies the HTML change to the element data-gid 70 by setting its outerHTML to the html snippet above. Doing so destroys the existing element data-gid="72" and creates a new one, and the shadowRoot div-gid=72 is lost. In this case, the agent co-browse JavaScript 134 restores the shadowRoot from the Shadow DOM HTML Map 136 by retrieving the HTML (shadow DOM) associated with data-gid=72 from the Shadow DOM HTML Map 136. Because the Agent retains this map, there is no need for the visitor co-browse JavaScript 130 to re-send the content of the shadow DOM region 204 of the element with div-gid=72 since the HTML of the shadow DOM region 204 has not changed.

In some embodiments, restoring a shadow DOM element's shadowRoot from the Shadow DOM HTML Map 136 is a recursive process. If the restored HTML itself contains nested shadow DOM elements, those must be restored as well. Accordingly, in some embodiments, the shadow DOM of a shadow host element SH is restored from the Shadow DOM HTML Map 136, and then the shadow DOM of each nested shadow host element SH is restored from the Shadow DOM HTML Map 136.

In order for the agent co-browse JavaScript 134 to efficiently locate elements that are supposed to have a shadow- Root, all shadow host elements H are given a shadow host ID (data-sdid) as an attribute as well as data-gid (block 705). This allows the agent side JavaScript 134 to enumerate shadow DOM elements using the native querySelectorAll (block 710). For example, document.querySelectorAll(" [data-sdid]") may be used to find all shadow host elements SH within a top-level document having a particular data-sdid value. Similarly, e.shadowRoot.querySelectorAll(" [data-sdid]") can be used to find all shadow host elements within a nested shadow DOM region below element "e".

Once the nested shadow host elements 206 are located, the agent co-browse JavaScript obtains the HTML of the shadow DOM region 204 from the Shadow DOM HTML Map 136 data structure and applies it to the visitor DOM 122 in the Agent browser 128 without requiring the visitor 110 to transmit the content of the shadow DOM region 204 (block 715). Restoring the nested shadow DOM region 204 is a recursive process—for each nested shadow root the agent co-browse JavaScript 136 obtains the HTML of the nested shadow DOM tree from the Shadow DOM HTML Map 136 data structure (block 720).

As with elements in the top-level document, the state of elements in a Shadow DOM region 204 must be reflected over to the agent 112, for example to enable the agent browser 128 to display the contents of input fields, and so that scrollable elements are scrolled to the same position on the agent side as on the visitor side.

In some embodiments, the visitor co-browse JavaScript 130 scans the DOM 200, including the top-level DOM 202 and all detected shadow DOM regions 204 to find "input elements". As used herein, the term "input element" is used to refer to a DOM element that is configured to receive user input. Example input elements might include <input>, <textarea>, and <select> elements. In some embodiments, the visitor co-browse JavaScript 130 adds an input event listener 144 to each input element in the visitor DOM 122, and creates an input element list data structure 138 containing the data-gid and state of each input element.

In some embodiments, when the visitor co-browse JavaScript 130 first uploads the page data to the co-browse service 124, it includes the input element data structure 138 so that the input element data structure 138 and current input element state is forwarded to the agent co-browse JavaScript 134. Table I shows an example input element data structure 138 and a set of hypothetical values.

TABLE I

| gid | value |
|---|---|
| data-gid = "84" | "John" |
| data-gid = "72-548" | "123-456-7890" |
| data-gid = "72-675-876-900" | "200 Harvard Mill Square." |

When the agent 112 receives input values from the co-browse service 124, the agent co-browse JavaScript 134 finds each element contained in the input element data structure 138 by its data-gid, and sets its input value accordingly. Because data-gids contain a path through nested shadow DOM elements, the agent co-browse JavaScript 137 can efficiently locate the input elements by querying only within the particular DOM region identified by the hierarchical identification numbering system.

Changes to input values of an input element are handled the same way for elements within a shadow DOM region 204 as for elements in the top-level DOM 202. Specifically, visitor co-browse JavaScript 130 adds event listeners to DOM elements to detect events which may indicate a change in the value of input elements, such as mouseup, mousedown, cut, paste, or keydown. For example, if an input value is changed, as when for example if the visitor types into an input element or changes the selection in a dropdown list, the visitor co-browse JavaScript 130 detects the change and sends the new value to the co-browse service 124 to be forwarded to the agent co-browse JavaScript 134.

In a co-browse session 126, it is desirable to have scrolled elements on the visitor browser 118 appear as scrolled on the agent 112, and also to allow an agent 112 to remotely scroll any scrollable elements, even within a shadow DOM region 204, and have those scroll actions reflected on the visitor browser 118.

In some embodiments, scroll offsets of scroll elements within a shadow DOM region 204 are handled in a manner similar to inputs. In some embodiments, the visitor DOM 122 is scanned by the visitor co-browse JavaScript 130 for scrollable elements and a scroll event listener 146 is added to each scrollable element in the visitor DOM 122. The visitor co-browse JavaScript 130 uploads an initial set of scroll offsets to the co-browse service 124 with the initial page upload. The visitor co-browse JavaScript 130 then detects scroll offset changes, and uploads the changes to the co-browse service 124 as they occur. Scroll events identify the scroll element by data-gid, which enables the agent co-browse JavaScript 134 to quickly locate the scroll element, even within a nested shadow DOM region 204, and apply the current scroll value to the scroll element.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory tangible computer-readable medium and implemented by multi-purpose tangible processors, and any combinations thereof.

The methods described herein may be implemented as software configured to be executed in control logic such as contained in a CPU of an electronic device such as a computer. The functions described herein may be implemented as sets of program instructions that are stored in a non-transitory tangible computer readable medium. When implemented in this manner, the computer program includes a set of instructions which, when executed by a computer, cause the computer to perform a method to implement the functions described above. Programmable logic can be fixed temporarily or permanently in a non-transitory tangible computer readable medium such as a read-only memory chip, a computer memory, a disk, or other storage medium. In addition to being implemented in software, the logic described herein can be embodied using discrete components, integrated circuitry, programmable logic used in conjunction with a programmable logic device such as a Field Programmable Gate Array (FPGA) or microprocessor, or any other device including any combination thereof. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of co-browsing shadow DOM elements, the method comprising the steps of:
   loading a webpage and visitor co-browse JavaScript to a browser, the webpage being described by a Document Object Model (DOM) containing a plurality of DOM elements;
   scanning the DOM elements, by the visitor co-browse JavaScript, to identify a subset of DOM elements that are shadow host elements, each shadow host element referencing a shadow root of an associated shadow DOM region containing a respective subset of the DOM elements that are shadow DOM elements;
   assigning a respective unique ID to each DOM element, by the visitor co-browse JavaScript; and
   transmitting DOM updates containing information about the DOM elements and the assigned respective unique IDs, by the visitor co-browse JavaScript, on a co-browse session;
   wherein the respective unique ID of each shadow DOM element in a given shadow DOM region is assigned to include its unique ID and the unique ID of the shadow host element associated with the given shadow DOM region.

2. The method of claim 1, further comprising receiving the DOM updates by an agent browser and using the DOM updates to recreate the webpage.

3. The method of claim 2, further comprising using the unique IDs of the shadow DOM elements to locate the shadow DOM elements within the shadow DOM regions.

4. The method of claim 1, further comprising assigning each shadow host element a unique shadow host identifier, and transmitting the unique shadow host identifiers in the DOM updates.

5. The method of claim 4, wherein the shadow host identifier of a given shadow host has the same value as the given shadow host's unique ID.

6. The method of claim 1, further comprising scanning DOM elements of one of the shadow DOM regions, by the visitor co-browse JavaScript, to identify a subset of shadow DOM elements of the one of the shadow DOM regions that are nested shadow host elements, each nested shadow host element referencing a shadow root of an associated nested shadow DOM region containing a respective subset of the DOM elements that are nested shadow DOM elements;
   wherein the respective unique ID of each nested shadow DOM element is assigned its unique ID based on the unique ID of the shadow host element associated with the given shadow DOM region and the unique ID of the nested shadow host element associated with the given nested shadow DOM region.

7. The method of claim 1, further comprising adding a mutation observer to each shadow root to detect changes to the DOM within the shadow region associated with the respective shadow root.

8. The method of claim 1, further comprising scanning the DOM elements to identify DOM elements that are configured to receive user input (input elements);
   adding an input event listener to each input element;
   creating an input element list data structure containing the unique ID of each input element and a state of each input element; and
   transmitting the input element list data structure on the co-browse session.

9. The method of claim 1, further comprising:
   receiving an input element list data structure;
   identifying input elements from the input element list data structure;
   using the unique ID of each input element to locate the input elements in a top level DOM region or in shadow DOM regions; and
   applying respective input values to the located input elements.

10. The method claim 1, further comprising scanning the DOM elements to identify DOM elements that are configured to receive scroll actions (scrollable elements);
    adding a scroll event listener to each scrollable element;
    creating a scrollable element list data structure containing the unique ID of each scrollable element and a state of each scrollable element; and
    transmitting the scrollable element list data structure on the co-browse session.

11. The non method of claim 1, further comprising:
    receiving a scrollable element list data structure;
    identifying scrollable elements from the scrollable element list data structure;
    using the unique ID of each scrollable element to locate the scrollable elements in a top level DOM region or in shadow DOM regions; and
    applying respective scroll values to the located scrollable elements.

12. A method of co-browsing shadow DOM elements, the method comprising the steps of:
    loading a webpage and visitor co-browse JavaScript to a browser, the webpage being described by a Document Object Model (DOM) containing a plurality of DOM elements;
    scanning the DOM elements, by the visitor co-browse JavaScript, to identify a subset of DOM elements that are shadow host elements, each shadow host element referencing a shadow root of an associated shadow DOM region containing a respective subset of the DOM elements that are shadow DOM elements;
    assigning a respective unique ID to each DOM element;
    transmitting DOM updates containing information about the DOM elements and respective unique IDs by the visitor co-browse JavaScript on a co-browse session;
    assigning each shadow host element a unique shadow host identifier, and transmitting the unique shadow host identifiers in the DOM updates; and receiving the DOM updates by an agent browser and using the shadow host identifiers to identify DOM elements that are shadow host elements;

wherein the respective unique ID of each shadow DOM element in a given shadow DOM region is assigned its unique ID based on the unique ID of the shadow host element associated with the given shadow DOM region.

13. The method of claim 12, further comprising creating a shadow DOM HTML map in the agent browser, the shadow DOM HTML map correlating shadow host elements with shadow DOM regions.

14. The method of claim 13, further comprising receiving a DOM update that replaces a shadow DOM region; and restoring the shadow DOM region from the shadow DOM HTML map.

* * * * *